United States Patent
Hazelwood

(10) Patent No.: US 7,155,220 B2
(45) Date of Patent: Dec. 26, 2006

(54) SYSTEM AND METHOD OF PROVIDING ACCESS TO INTELLIGENT NETWORK SERVICES FROM A PLURALITY OF TELECOMMUNICATIONS NETWORKS

(75) Inventor: Steve Hazelwood, Richardson, TX (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 856 days.

(21) Appl. No.: 10/002,372

(22) Filed: Nov. 23, 2001

(65) Prior Publication Data

US 2003/0100304 A1  May 29, 2003

(51) Int. Cl.
*H04Q 7/20* (2006.01)
(52) U.S. Cl. ....................................... 455/433
(58) Field of Classification Search ............. 455/432.1, 455/432.2, 433.3, 408, 466, 436, 552.1, 561, 455/437, 438, 439, 435.1, 433, 465, 432.3; 709/230; 379/230
See application file for complete search history.

(56) References Cited

U.S. PATENT DOCUMENTS

| | | | |
|---|---|---|---|
| 5,950,126 A * | 9/1999 | Palviainen et al. ......... 455/423 |
| 6,507,649 B1 * | 1/2003 | Tovander ..................... 379/230 |
| 6,788,959 B1 * | 9/2004 | Jokinen et al. .......... 455/552.1 |
| 2002/0169883 A1* | 11/2002 | Bright et al. ............... 709/230 |
| 2003/0125013 A1* | 7/2003 | Mizell et al. ............... 455/408 |

* cited by examiner

*Primary Examiner*—Melody Mehpour

(57) ABSTRACT

A system and method of providing a subscriber in an ANSI-41 radio telecommunications network with access to an IN service in a GSM overlay network. A special Preferred Inter-exchange Carrier (PIC) category associated with the IN service is specified in the subscriber's database in the ANSI-41 Home Location Register (HLR). When an originating or terminating call for the subscriber is detected, the special PIC category is translated to a special Carrier Identification Code (CIC) code that is sent to a Mobile Switching Center/Visitor Location Register (MSC/VLR) serving the subscriber. The MSC/VLR analyzes the special CIC code and in response, routes the call to a Service Switching Point (SSP) in the GSM network rather than to an inter-exchange carrier. The SSP then accesses the IN service through a Service Control Point (SCP) in the GSM network.

17 Claims, 5 Drawing Sheets

SYSTEM AND METHOD OF PROVIDING ACCESS TO INTELLIGENT NETWORK SERVICES FROM A PLURALITY OF TELECOMMUNICATIONS NETWORKS

BACKGROUND OF THE INVENTION

1. Technical Field of the Invention

This invention relates to telecommunication systems. More particularly, and not by way of limitation, the present invention is directed to a system and method of providing access to Intelligent Network (IN) services from a plurality of dissimilar telecommunications networks.

2. Description of Related Art

Telecommunications networks may be broadly categorized as wireline or wireless. In both types of networks, subscribers are often provided with enhanced subscriber services by accessing an Intelligent Network (IN). In general, a Service Switching Point (SSP) in the IN is utilized to access an IN Service Control Point (IN-SCP) which executes service scripts in order to provide the IN services. The data for the IN services may be stored within the SCP or in a separate IN Service Data Point (IN-SDP).

Within the wireless category of telecommunications networks, two main mobile telecommunications technologies are utilized: Global System for Mobile Communications (GSM) and the ANSI-41 standard. ANSI-41 networks may utilize either Time Division Multiple Access (TDMA) or Code Division Multiple Access (CDMA) technology for digital sharing of network bandwidth. Both GSM and ANSI-41 networks provide IN services to their subscribers, but the services are accessed in different ways. In general, ANSI-41 has standards for triggering access to a separate IN network, while GSM has built-in IN services. A subscriber with an ANSI-41-compliant mobile station (MS) may access the IN services only in an ANSI-41 network, while a subscriber with a GSM-compliant MS may access the IN services only in a GSM network. As long as a subscriber remains within the appropriate network for his type of MS, there is no problem. However, when the subscriber crosses from a network based on one technology to a network based on the other technology, there is no linkage to enable the subscriber to access IN services.

A GSM overlay network is implemented by system operators who are transitioning from ANSI-41 to GSM. The GSM overlay network may cover approximately the same geographic area as the underlying ANSI-41 network. The overlay network enables the operator to provide GSM services to those mobile subscribers who have GSM-compliant MSs. For those subscribers who have ANSI-41-compliant MSs, the operator can continue to provide ANSI-41 services. Eventually, as the original ANSI-41 MSs are replaced with GSM MSs, the system operators may eliminate the ANSI-41 network and discontinue ANSI-41 services.

A problem with overlay networks, however, is the high cost to the operators of duplicating all of the services that are provided in each network. In the case of IN services, these services must currently be duplicated since the GSM and ANSI-41 networks utilize different and incompatible methods of accessing the IN services. It would be desirable to provide the ANSI-41 subscribers with direct access to some or all of the GSM IN services, thereby eliminating the cost of duplicating these services. For example, the GSM network provides a Prepaid service that allows a mobile subscriber to prepay for an amount of telephone time. An account balance is maintained for the subscriber in an IN-SDP, and whenever the subscriber uses his MS to place or receive a call, the corresponding cost of the call is deducted from the subscriber's prepaid account. The service is convenient for the subscriber, and can be activated using the subscriber's existing telephone number.

ANSI-41 networks also have a Prepaid service, but it is not as convenient for the subscriber. The ANSI-41 service is a trunking-based solution that requires that the subscriber obtain a different telephone number for use with the Prepaid service. It would be advantageous for ANSI-41 subscribers to be able to access the GSM Prepaid service in the GSM overlay network, thus eliminating the requirement to have a different telephone number for the Prepaid account. The operator would also save the cost of implementing and maintaining two different types of Prepaid services. However, ANSI-41 subscribers cannot currently access and utilize the GSM Prepaid service.

SUMMARY OF THE INVENTION

In one aspect, the present invention is directed to a method of accessing an Intelligent Network (IN) service from any one of a plurality of dissimilar telecommunications networks. The method includes the steps of identifying a function that is common to each of the plurality of dissimilar telecommunications networks; identifying an interface within the common function that is common to each of the plurality of dissimilar telecommunications networks; modifying the common interface to direct designated calls to an Intelligent Network (IN); and executing the IN service by the IN network upon receiving a designated call.

In another aspect, the present invention is directed to a method of providing a particular subscriber in a first telecommunications network with access to an Intelligent Network (IN) service that is accessed through a switching node in a second telecommunications network. The first network provides the subscriber with equal access to a plurality of Inter-Exchange Carriers by assigning to each carrier, an associated Carrier Identification Code (CIC) code, and utilizing the CIC code associated with the subscriber's chosen carrier to route the subscriber's originating and terminating calls to the chosen carrier. The method includes the steps of specifying in the first network, a special CIC code for the IN service; associating the special CIC code with the subscriber; and detecting in the first network, an originating or terminating call for the subscriber. This is followed by routing the call from the first network to the switching node in the second network based upon the special CIC code associated with the subscriber; and accessing the IN service in the second network from the switching node.

In yet another aspect, the present invention is directed to a method of providing a particular subscriber in an ANSI-41 radio telecommunications network with access to an IN service that is accessed through a Service Switching Point (SSP) in a Global System for Mobile Communications (GSM) overlay network. The ANSI-41 network provides the subscriber with equal access to a plurality of Inter-Exchange Carriers by assigning to each carrier, an associated CIC code, and utilizing the CIC code associated with the subscriber's chosen carrier to route to the chosen carrier, the subscriber's originating and terminating calls. The method includes the steps of specifying a special Preferred Inter-Exchange Carrier (PIC) category in the particular subscriber's subscriber database in a Home Location Register (HLR) in the ANSI-41 network; detecting an originating or terminating call for the subscriber; and translating in the HLR, the special PIC category to a special CIC code associated with the IN service. This is followed by sending the special CIC code to a traffic router in a Mobile Switching Center/Visitor Location Register (MSC/VLR) in the ANSI-41 network, and performing an analysis of the special CIC code in the traffic router to determine where the call should be routed. In response to the analysis of the special CIC code, the call is routed from the MSC/VLR to the SSP in the GSM overlay network, and the IN service is accessed through a Service Control Point (SCP) in the GSM overlay network.

In still yet another aspect, the present invention is directed to a system for providing a particular subscriber in a first telecommunications network with access to an IN service that is accessed through a switching node in a second telecommunications network. The first network provides the subscriber with equal access to a plurality of Inter-Exchange Carriers by assigning to each carrier, an associated CIC code, and utilizing the CIC code associated with the subscriber's chosen carrier to route the subscriber's originating and terminating calls to the chosen carrier. The system includes a subscriber database modified to store a special Preferred Inter-Exchange Carrier (PIC) category for the subscriber, and a data translator modified to translate the special PIC category into a special CIC code associated with the IN service. The system also includes a switch in the first network that detects an originating or terminating call for the subscriber, and retrieves the special CIC code from the subscriber database in response thereto. The switch includes a traffic router that performs an analysis of the special CIC code, and in response to the analysis, routes the call from the first network to the switching node in the second network for access to the IN service.

In an exemplary preferred embodiment, the first network may be an ANSI-41 radio telecommunications network, the second network may be a GSM overlay network, and the IN service may be a GSM Prepaid service.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
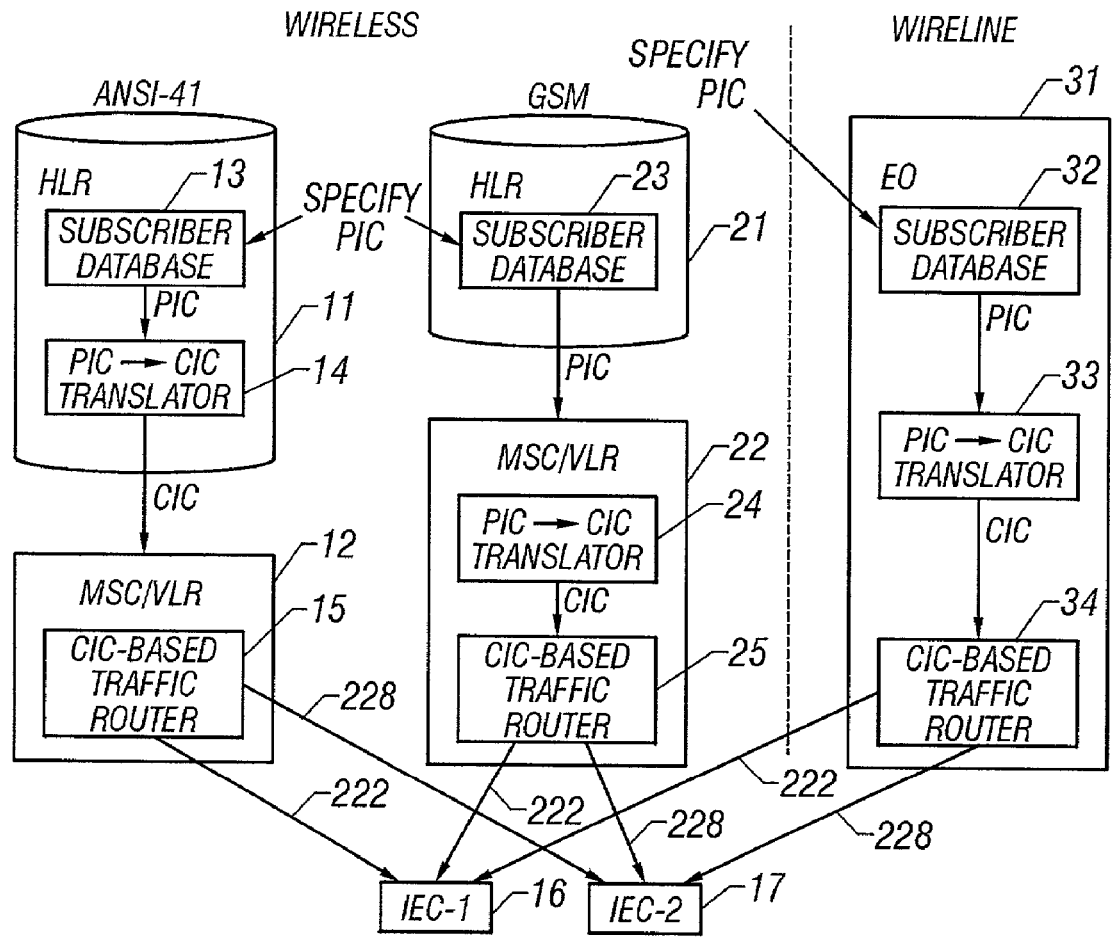
FIG. 1 (Prior Art) is a simplified block diagram of portions of a plurality of telecommunications networks illustrating existing connections to Inter-Exchange Carriers (IECs)

FIG. 1 is a simplified block diagram of portions of a plurality of telecommunications networks illustrating existing connections to Inter-Exchange Carriers (IECs). ANSI-41 and GSM wireless networks are shown as well as a wireline network. Within the ANSI-41 network is an ANSI-41 Home Location Register (HLR) 11 and a Mobile Switching Center/Visitor Location Register (MSC/VLR) 12. The ANSI-41 network supports Equal Access, thus enabling each subscriber to select his own long distance carrier (i.e., IEC). Equal Access is the specification and use of IECs for setup of call segments that cross a Local Access and Transport Area (LATA) boundary. Equal Access is available for both the calling subscriber and the called subscriber for their respective call segments.

When a new subscriber joins the ANSI-41 network and specifies a long distance carrier, or when an existing subscriber changes his carrier, a Preferred Inter-Exchange Carrier (PIC) category is assigned and stored in a subscriber database 13 in the HLR 11. Thereafter, whenever the subscriber wishes to use his MS to place or receive a long distance call, the PIC category is translated to a 3 or 4-digit Carrier Identification Code (CIC) by a PIC-to-CIC translator 14 in the HLR. The CIC code is then sent to the MSC/VLR 12 where a CIC-based traffic router 15 analyzes the CIC code and routes the call to the proper IEC. For example, a first CIC code such as 222 may route the call to IEC-1 16 while a second CIC code such as 228 may route the call to IEC-2 17. During call setup, the calling subscriber's chosen carrier is used for the call segment(s) leading up to the gateway for the called subscriber. Thereafter, the called subscriber's chosen carrier is used for the remaining call segment if the called subscriber has roamed or call redirection is activated, and a LATA boundary is crossed.

The GSM network includes a GSM HLR 21 and an MSC/VLR 22. The GSM network also supports Equal Access, thus enabling each subscriber to select his own IEC. When a new subscriber joins the GSM network and specifies an IEC, or when an existing subscriber changes his IEC, a PIC category is assigned and stored in a subscriber database 23 in the HLR. Thereafter, whenever the subscriber wishes to use his MS to place or receive a long distance call, the PIC category is sent from the HLR to the MSC/VLR where a PIC-to-CIC translator 24 performs a data translation to translate the PIC category to a CIC code. A CIC-based traffic router 25 then analyzes the CIC code and routes the call to the proper IEC.

The wireline network includes an End Office (EO) 31. The EO includes a subscriber database 32, a PIC-to-CIC translator 33, and a CIC-based traffic router 34. The wireline network also supports Equal Access, thus enabling each subscriber to select his own IEC. When a new subscriber joins the wireline network and specifies an IEC, or when an existing subscriber changes his IEC, a PIC category is specified and stored in the subscriber database 32. Thereafter, whenever the subscriber wishes to place or receive a long distance call, the PIC category is translated to a CIC code by the PIC-to-CIC translator 33. The CIC-based traffic router 34 then analyzes the CIC code and routes the call to the proper IEC.

The present invention provides a subscriber in any one of a plurality of dissimilar telecommunications networks with the ability to access an Intelligent Network (IN) service in an IN network. The invention identifies a function that is common to each of the plurality of dissimilar telecommunications networks, identifies an interface within the common function that is common to each of the plurality of dissimilar telecommunications networks, and modifies the common interface to direct designated calls to an Intelligent Network (IN) where the IN service is executed. In the preferred embodiment described below, the common function that is utilized for this purpose is the Equal Access function. The common interface is the CIC-based traffic router which is modified to route a call with a special CIC to the IN network rather than an IEC.

Figure 2:
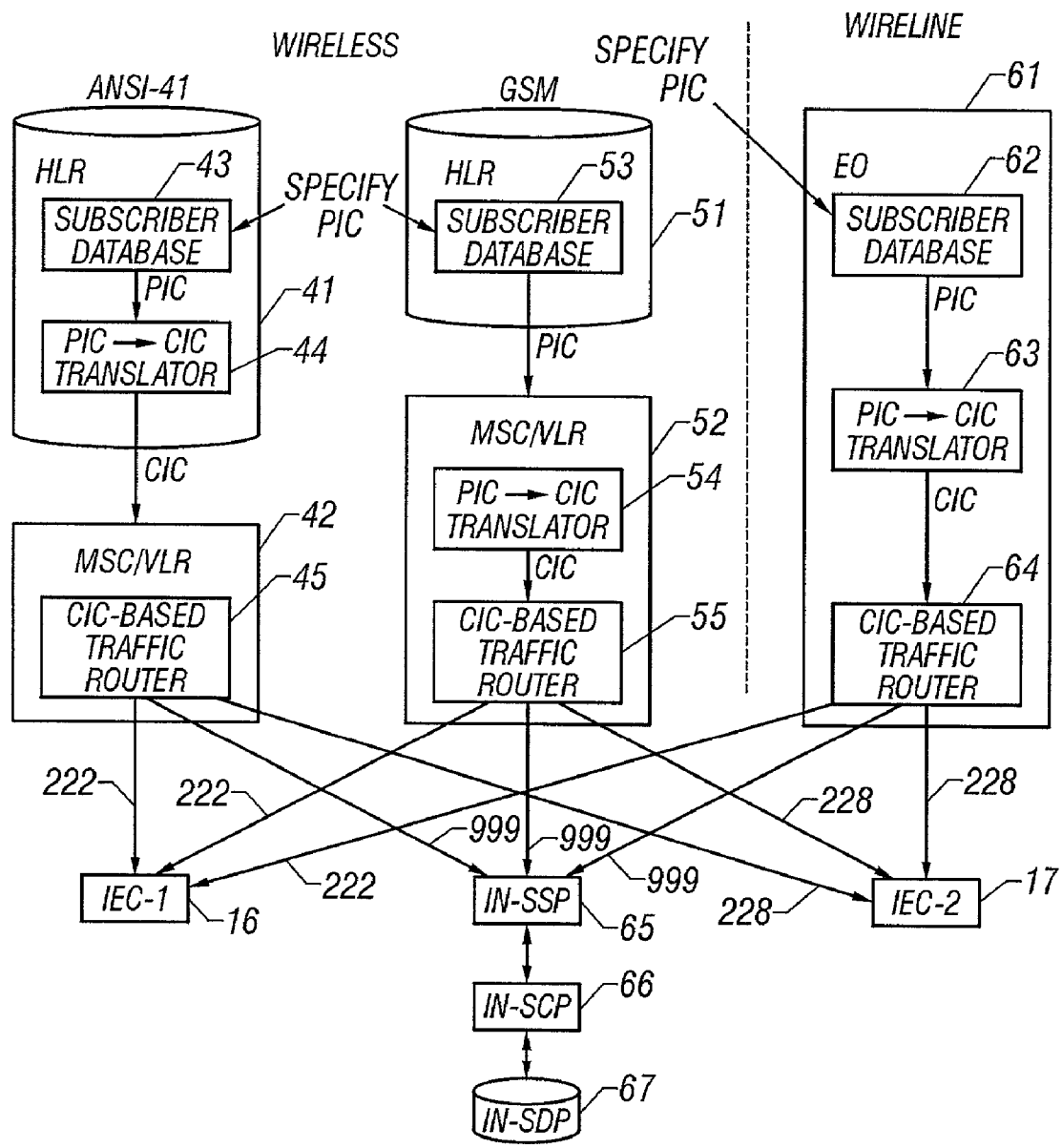
FIG. 2 is a simplified block diagram of portions of a plurality of telecommunications networks modified in accordance with the teachings of the present invention to provide access to an Intelligent Network (IN)

FIG. 2 is a simplified block diagram of portions of a plurality of telecommunications networks modified in accordance with the teachings of the present invention to provide access to an Intelligent Network (IN). Within the ANSI-41 network, the HLR 41 and the MSC/VLR 42 are modified to provide access to the IN. When a subscriber in the ANSI-41 network desires to utilize an IN service, a special PIC category is stored in the subscriber database 43 in the network's HLR. In ANSI-41 networks, the PIC category is translated to a CIC code in the PIC-to-CIC translator 44 in the HLR. The CIC code is normally utilized in a CIC-based traffic router 45 to route calls to the appropriate IEC. In the present invention, however, the special PIC category is translated to a special CIC code such as 999 that is associated with the desired IN service. When the subscriber originates or receives a call requiring the IN service, the CIC-based traffic router 45 analyzes the special 999 CIC code, and routes the call to an IN Service Switching Point (IN-SSP) 65 rather than an IEC. The IN service is then provided through an IN Service Control Point (IN-SCP) 66 and an IN Service Data Point (IN-SDP) 67.

Within the GSM network, the HLR 51 and the MSC/VLR 52 are also modified to provide access to the IN. When a subscriber in the GSM network desires to utilize an IN service, a special PIC category is stored in the subscriber database 53 in the network's HLR. When the subscriber originates or receives a call requiring the IN service, the special PIC category is translated to a special CIC code such as 999 in a PIC-to-CIC translator 54 in the MSC/VLR. The CIC code is then utilized in a CIC-based traffic router 55 to route the call to the IN-SSP 65 for access to the IN service.

Likewise, the EO 61 within the wireline network is modified to provide access to the IN. When a subscriber in the wireless network desires to utilize an IN service, a special PIC category is stored in the subscriber database 62. When the subscriber originates or receives a call requiring the IN service, the special PIC category is translated to a special CIC code such as 999 in the PIC-to-CIC translator 63 in the EO. The CIC code is then utilized in a CIC-based traffic router 64 to route the call to the IN-SSP 65 for access to the IN service.

In an example in which a subscriber in an ANSI-41 network desires to use a Prepaid IN service provided by a GSM overlay network, the following specific modifications are made to the ANSI-41 network nodes. Fist, the special PIC category and CIC code for the GSM Prepaid service are programmed in the HLR 41 so that it can do the data translation. The MSC/VLR 42 is also programmed to recognize the special CIC code. Additionally, the IN-SSP 65 is added to the CIC-based traffic router 45 as an additional IEC so that the MSC/VLR will route the call to the IN-SSP when it recognizes the special CIC code.

Since all of the networks must support the use of CIC codes in order to provide Equal Access, this feature provides common ground for establishing a linkage to the IN and triggering IN services. In so doing, the present invention enables a plurality of dissimilar networks to access and utilize a single IN-based service. For example, in an exemplary preferred embodiment described below, the invention provides a single Prepaid service to cover both an ANSI-41 network and a GSM overlay network by enabling ANSI-41 subscribers to access and utilize the GSM Prepaid service. Prepaid traffic in the ANSI-41 network is routed to the GSM Prepaid service without impacting Equal Access.

Figure 3:
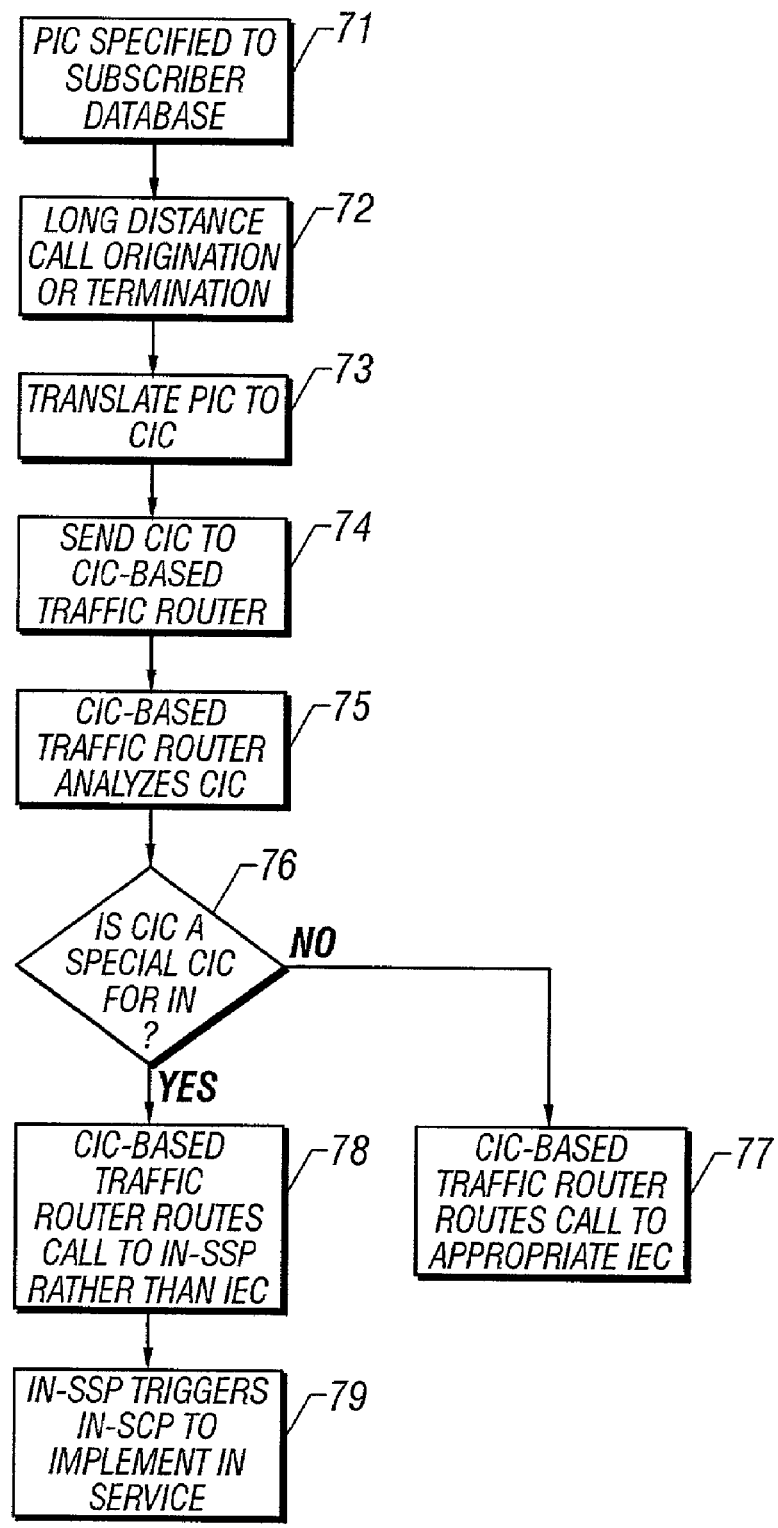
FIG. 3 is a flow chart illustrating the steps of the preferred embodiment of the method of the present invention.

FIG. 3 is a flow chart illustrating the steps of the preferred embodiment of the method of the present invention. The present invention utilizes the CIC code to provide the linkage between the ANSI-41 network, the GSM network, and the IN service nodes. As noted above, the CIC code is normally used for long distance routing between IECs. At step 71, a PIC category is specified, for example, to the subscriber database 43 in the ANSI-41 network. The subscriber database is modified to accept and store a special internal PIC category associated with the IN network. At step 72, the subscriber begins a long distance call origination or termination. At step 73, the specified PIC category is translated to a CIC code by the PIC-to-CIC translator 44. The CIC code may be associated with a chosen IEC, or may be associated with the IN network. At step 74, the CIC code is sent to the CIC-based traffic router 45 in the MSC/VLR 42. The CIC-based traffic router analyzes CIC codes, and is modified to route the call to the IN-SSP 65 in the associated IN network upon recognizing a special CIC code.

At step 75, the CIC-based traffic router 45 analyzes the CIC code. At step 76, it is determined whether or not the CIC code is the special CIC code (for example 999) associated with the IN network. If not, the process moves to step 77 where the CIC-based traffic router routes the call to the appropriate IEC associated with the received CIC code. However, if the CIC code is the special 999 CIC code associated with the IN network, the process moves to step 78 where the CIC-based traffic router routes the call to the IN-SSP 65 via an ISUP trunk rather than to an IEC. The IN-SSP may be, for example, in a GSM overlay network, or in a separate IN network.

After the 999 CIC code triggers the CIC-based traffic router 45 to route the call to the IN-SSP 65, the SSP triggers the IN-SCP 66 to implement the Prepaid service at step 79 in conjunction with the IN-SDP 67. The IN-SDP stores prepaid subscriber account information and the current balance in the Prepaid account.

It should be noted that the invention may also operate in reverse, that is, the invention may be utilized to route a call from a GSM subscriber to IN services normally accessible only from the ANSI-41 network. In fact, by utilizing the present invention, a subscriber in any network can access IN services in any other network, as long as both networks use CIC codes to provide Equal Access.

In order to implement the present invention, a telecommunications network must support:

(1) a PIC category for individual subscriptions as well as the translation to CIC codes upon call origination, call termination, and call forwarding; and (2) Equal Access Carrier Analysis, and the appending of unique prefix digits to a called party number based on the analysis.

Note that if the second requirement cannot be met, two dedicated ISUP trunks from the network to the IN-SSP may alternatively be implemented. One trunk is for originating traffic, and one trunk is for terminating traffic.

The network operator may also be given the option to restore a subscriber's original IEC information based on the subscriber's Service Class. Every unique PIC category has a corresponding Service Class. During call setup, depending on the Service Class returned from the interrogation of the IN-SDP 67, the IN-SCP 66 can pass the original CIC code to the IN-SSP 65 when the IN-SCP orders the IN-SSP to route and connect the call.

Figure 4:
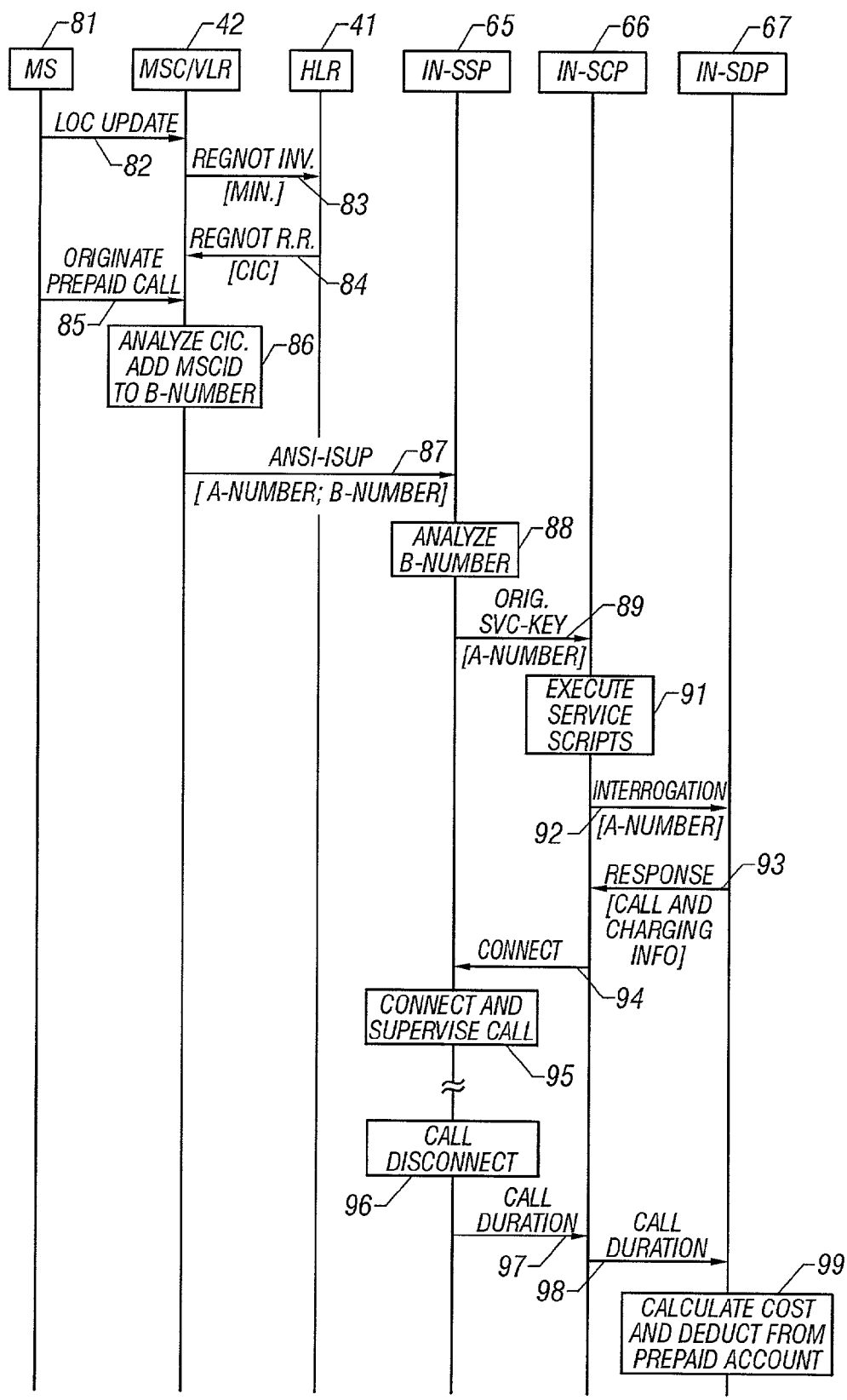
FIG. 4 is a message flow diagram illustrating the flow of messages between network nodes when a Prepaid subscriber in a non-GSM network originates a call and utilizes the GSM Prepaid service.

FIG. 4 is a message flow diagram illustrating the flow of messages between network nodes when a Prepaid subscriber in a non-GSM network such as an ANSI-41 network originates a call and utilizes the GSM Prepaid service. The illustrated nodes include an ANSI-41 mobile station (MS) 81, the ANSI-41 MSC/VLR 42, the ANSI-41 HLR 41, the IN-SSP 65, the IN-SCP 66, and the IN-SDP 67. At step 82, the MS, which has moved into the service area of the MSC/VLR, performs a location update. In response, the MSC/VLR sends the Mobile Identification Number (MIN) of the MS to the HLR in a Registration Notification (REG-NOT) Invoke message at step 83. At step 84, the HLR retrieves the subscriber's information from the subscriber database 43, translates the PIC category to a CIC code, and returns the information, including the CIC code, to the MSC/VLR. In the illustrated case, the CIC code is a special code such as 999, indicating that the subscriber is a Prepaid subscriber, and any calls should be routed to the IN-SSP.

At step 85, the MS 81 originates a Prepaid call through the MSC/VLR 42. At step 86, the MSC/VLR performs an analysis of the subscriber's 999 CIC code. The analysis causes the MSC/VLR to add its MSC Identification Digits (MSCID) to the Called Party Number (B-number). At step 87, an analysis of the B-number then routes the call via ANSI-ISUP signaling to the IN-SSP 65 with the Calling Party Number (A-number) and the Called Party Number (B-number). At step 88, the IN-SSP performs an analysis of the MSCID/B-number which, based on the MSCID, triggers a unique originating Service Key 89 towards the IN-SCP 66.

At step 91, the IN-SCP 66 executes a supplemental service script that splits the MSCID/B-number into a Location Number (MSCID) and a B-number. The IN-SCP then executes standard Prepaid service scripts to rate the call. At step 92, the IN-SCP interrogates the IN-SDP 67 with the A-number to retrieve call and charging information based on the A-number. The rate can be calculated based on the Traffic Case (Origination), Service Class, B-number, and Location Number, as well as Day, Date, Time, and the like. At step 93, the IN-SDP returns the call and charging information to the IN-SCP.

At step 94, the IN-SCP 66 orders the IN-SSP 65 to connect and supervise the call, which is performed at step 95. At the conclusion of the call (i.e., call disconnect) 96, the IN-SSP sends the call duration 97 to the IN-SCP. At step 98, the call duration is further passed to the IN-SDP 67, and at step 99, the IN-SDP uses the call duration and the call rate to calculate the cost of the call which is then deducted from the subscriber's Prepaid account.

Figure 5:
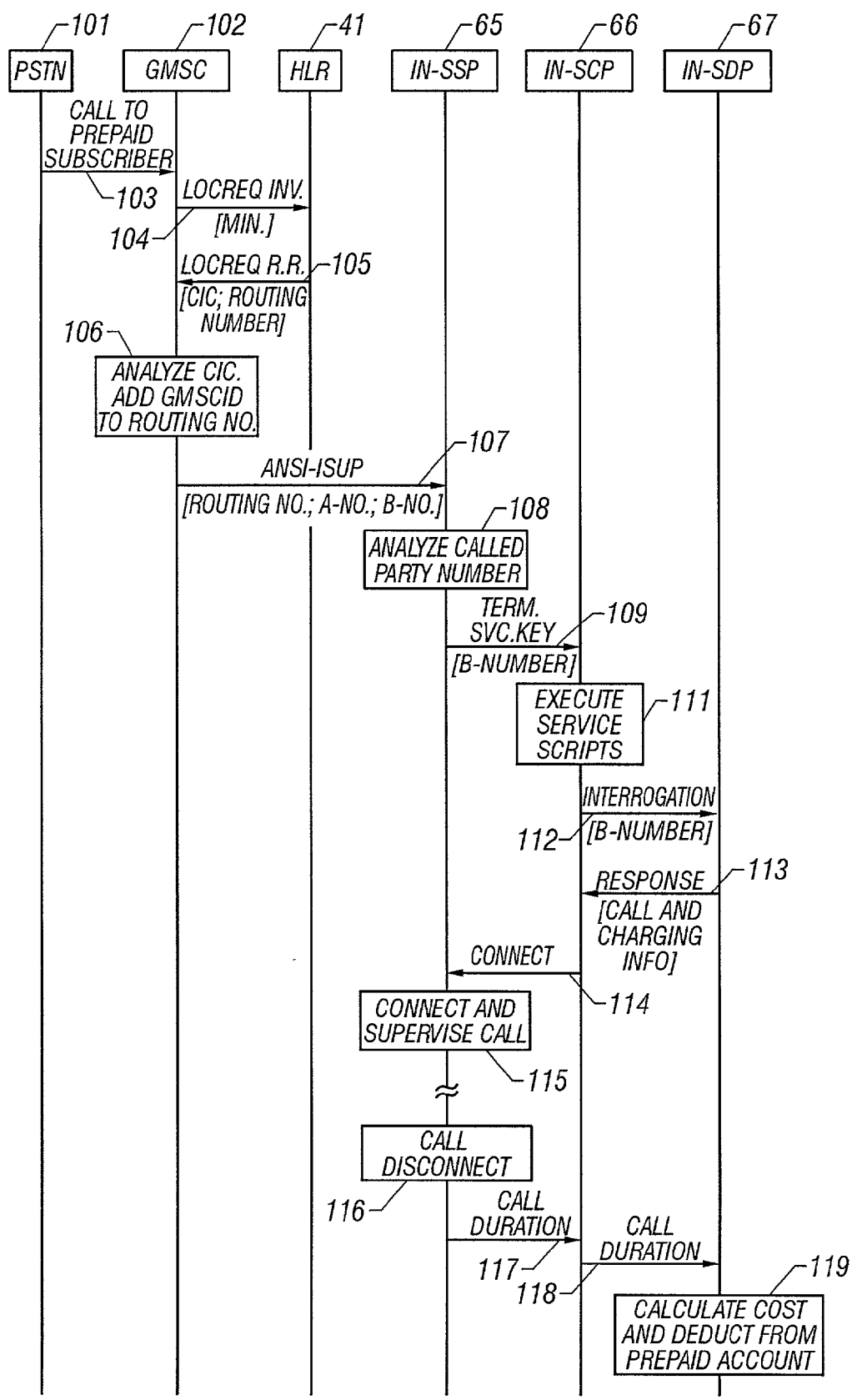
FIG. 5 is a message flow diagram illustrating the flow of messages between network nodes when a Prepaid subscriber in a non-GSM network receives a call and utilizes the GSM Prepaid service.

FIG. 5 is a message flow diagram illustrating the flow of messages between network nodes when a Prepaid subscriber in a non-GSM network such as an ANSI-41 network receives a call and utilizes the GSM Prepaid service. In the illustrated case, the call originates in the Public Switched Telephone Network (PSTN) 101, and is received in a Gateway MSC (GMSC) 102 in the ANSI-41 network. The GMSC is modified in the same manner as the MSC/VLR 42. The remaining nodes are as shown in FIGS. 2 and 4.

At step 103, a call from a subscriber in the PSTN 101 is directed to the Prepaid ANSI-41 subscriber, and is received in the GMSC 102. In response, the GMSC sends the MIN of the called MS to the HLR 41 in a Location Request (LOCREQ) Invoke message at step 104. At step 105, the HLR retrieves the subscriber's information from the subscriber database 43, translates the PIC category to a CIC code, and returns the information, including the CIC and a Roaming Routing Number, to the GMSC. In the illustrated case, the CIC code is a special code such as 999, indicating that the called subscriber is a Prepaid subscriber, and any calls should be routed to the IN-SSP 65.

At step 106, the GMSC 102 performs an analysis of the subscriber's 999 CIC code. The analysis causes the GMSC to add its GMSC Identification Digits (GMSCID) to the Called Party Number (Roaming Routing Number). At step 107, an analysis of the Called Party Number then routes the call via ANSI-ISUP signaling to the IN-SSP 65 with the parameters Roaming Routing Number, Calling Party Number (A-number), and the Original Called Number (B-number). At step 108, the IN-SSP performs an analysis of the Called Party Number, and the GMSCID triggers a unique terminating Service Key 109 towards the IN-SCP 66.

At step 111, the IN-SCP 66 executes modified Prepaid service scripts that split the Location Number (GMSCID) from the Roaming Routing Number. The IN-SCP then executes standard Prepaid service scripts to rate the call. At step 112, the IN-SCP interrogates the IN-SDP 67 with the Original Called Number (B-number) to retrieve call and charging information based on the B-number. The rate can be calculated based on the Traffic Case (Termination), Service Class, B-number, and Location Number, as well as Day, Date, Time, and the like. At step 113, the IN-SDP returns the call and charging information to the IN-SCP.

At step 114, the IN-SCP 66 orders the IN-SSP 65 to connect and supervise the call, which is performed at step 115. At the conclusion of the call (i.e., call disconnect) 116, the IN-SSP sends the call duration 117 to the IN-SCP. At step 118, the call duration is further passed to the IN-SDP 67, and at step 119, the IN-SDP uses the call duration and the call rate to calculate the cost of the call which is then deducted from the subscriber's Prepaid account.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of accessing an Intelligent Network (IN) service from any one of a plurality of dissimilar telecommunications networks, said method comprising the steps of:
    identifying a function that is common to each of the plurality of dissimilar telecommunications networks;
    identifying an interface within the common function that is common to each of the plurality of dissimilar telecommunications networks;
    modifying the common interface to direct designated calls to an Intelligent Network (IN);
    detecting a special IN service Carrier Identification Code (CIC); and
    executing the IN service by the IN network through an IN Service Control Point (IN-SCP) and IN Service Data point (IN-SDP) upon receiving an originating or terminating call to an IN service Switching Point (IN-SSP).

2. The method of accessing an IN service, of claim 1 wherein the interface within the common function that is common to each of the plurality of dissimilar telecommunications networks is a traffic router interface that analyzes the CIC code received during a call, and routes the call to an appropriate destination.

3. The method of accessing an IN service of claim 2 wherein the step of modifying the common interface to direct designated calls to an IN network includes specifying a special CIC code which triggers the traffic router interface to route the call to a switching node in the IN network rather than to an IEC.

4. A method of providing a particular subscriber in a first telecommunications network with access to an Intelligent Network (IN) service that is accessed through a switching node in a second telecommunications network, said first network providing the subscriber with equal access to a plurality of inter-exchange carriers by assigning to each carrier, an associated carrier identification code (CIC) code, and utilizing the CIC code associated with the subscriber's chosen carrier to route to the chosen carrier, the subscriber's originating and terminating calls, said method comprising the steps of:

specifying in the first network, a special CIC code for the IN service;

associating the special CIC code with the subscriber;

detecting in the first network, an originating or terminating call for the subscriber;

routing the call from the first network to the switching node in the second network based upon the special CIC code associated with the subscriber, the switching node being identified by the special CIC code; and accessing the IN service in the second network from the switching node.

5. The method of providing access to an IN service of claim 4 wherein the step of specifying a special CIC code for the IN service includes the steps of:

specifying a special preferred inter-exchange carrier (PIC) category in a subscriber database in the first network; and translating the special PIC category to the special CIC code upon detecting an originating or terminating call for the subscriber.

6. The method of providing access to an IN service of claim 5 wherein the first network is an ANSI-41 network, and the step of translating the special PIC category to the special CIC code is performed in a Home Location Register (HLR).

7. The method of providing access to an IN service of claim 5 wherein the first network is a Global System for Mobile Communication (GSM) network, and the step of translating the special PIC category to the special CIC code is performed in a Mobile Switching Center/Visitor Location Register (MSC/VLR).

8. The method of providing access to an IN service of claim 4 wherein the step of routing the call from the first network to a switching node in the second network includes:

sending the special CIC code to a traffic router;

performing an analysis of the special CIC code in the traffic router; and in response to said analysis, routing the call to the switching node in the second network.

9. The method of providing access to an IN service of claim 4 wherein the first network is an ANSI-41 network, and the second network is a Global System for Mobile Communication (GSM) overlay network, and the step of routing the call from the first network to a switching node in the second network includes routing the call from a Mobile Switching Center (MSC) in the ANSI-41 network to a Service Switching Point (SSP) in the GSM network.

10. The method of providing access to an IN service of claim 9 wherein the step of accessing the IN service in the second network includes accessing a GSM Prepaid service through a Service Control Point (SCP) in the GSM network.

11. A method of providing a particular subscriber in an ANSI-41 radio telecommunications network with access to an Intelligent Network (IN) service that is accessed through a Service Switching Point (SSP) in a Global System for Mobile Communications (GSM) overlay network, said ANSI-41 network providing the subscriber with equal access to a plurality of inter-exchange carriers by assigning to each carrier, an associated carrier identification code (CIC) code, and utilizing the CIC code associated with the subscriber's chosen carrier to route to the chosen carrier, the subscriber's originating and terminating calls, said method comprising the steps of:

specifying a special preferred inter-exchange carrier (PIC) category in the particular subscriber's subscriber database in a Home Location Register (HLR) in the ANSI-41 network;

detecting an originating or terminating call for the subscriber;

translating in the HLR, the special PIC category to a special CIC code associated with the IN service;

sending the special CIC code to a traffic router in a Mobile Switching Center/Visitor Location Register (MSC/VLR) in the ANSI-41 network;

performing an analysis of the special CIC code in the traffic router to determine where the call should be routed;

in response to said analysis of the special CIC code, routing the call from the MSC/VLR to the SSP in the GSM overlay network; and accessing the IN service through a Service Control Point (SCP) in the GSM overlay network.

12. The method of claim 11 wherein the step of accessing the IN service through an SCP in the GSM network includes accessing a GSM Prepaid service through the SCP.

13. A system for providing a particular subscriber in a first telecommunications network with access to an Intelligent Network (IN) service that is accessed through a switching node in a second telecommunications network, said first network providing the subscriber with equal access to a plurality of inter-exchange carriers by assigning to each carrier, an associated carrier identification code (CIC) code, and utilizing the CIC code associated with the subscriber's chosen carrier to route to the chosen carrier, the subscriber's originating and terminating calls, said system comprising:

a subscriber database modified to store a special preferred inter-exchange carrier (PIC) category for the subscriber;

a data translator modified to translate the special PIC category into a special CIC code associated with the IN service; and a switch in the first network that detects an originating or terminating call for the subscriber, and retrieves the special CIC code from the subscriber database in response thereto, said switch including a traffic router that performs an analysis of the special CIC code, and in response to said analysis, routes the call from the first network to the switching node identified by the special CIC code, in the second network for access to the IN service.

14. The system for providing access to an IN service of claim 13 wherein the first network is a Global System for Mobile Communications (GSM) radio telecommunications network, and the subscriber database is implemented in a Home Location Register (HLR), and the data translator is implemented in the switch.

15. The system for providing access to an IN service of claim 13 wherein the first network is an ANSI-41 radio telecommunications network, and the subscriber database and the data translator are implemented in a Home Location Register (HLR).

16. The system for providing access to an IN service of claim 15 wherein the second network is a Global System for Mobile Communications (GSM) overlay radio telecommunications network that provides GSM services to GSM subscribers in a geographical area that is also served by the ANSI-41 network.

17. The system for providing access to an IN service of claim 15 wherein the switching node in the second network is a Service Switching Point (SSP) in the GSM network, and the SSP provides access to a GSM Prepaid service through a Service Control Point (SOP) in the GSM network.

* * * * *